United States Patent [19]
Schaefer

[11] 3,769,450
[45] Oct. 30, 1973

[54] CROSS TALK REDUCING CIRCUITRY FOR ENCODED COLOR TELEVISION CAMERAS

[75] Inventor: Louis F. Schaefer, Palo Alto, Calif.

[73] Assignee: Stanford Research Institute, Menlo Park, Calif.

[22] Filed: Aug. 4, 1972

[21] Appl. No.: 278,122

[52] U.S. Cl. ..... 178/5.4 R, 178/5.4 ST, 179/15 AN
[51] Int. Cl. .......... H04n 9/06
[58] Field of Search .......... 178/5.4 R, 5.4 ST; 179/15 AN

[56] References Cited

UNITED STATES PATENTS 2,870,247 1/1959 Cherry .......... 179/15 AN X
2,951,903 9/1960 Vrijer .......... 179/15 AN
3,566,013 2/1971 Macovski .......... 178/5.4 ST

*Primary Examiner*—Robert L. Richardson
*Attorney*—Urban Faubion et al.

[57] ABSTRACT

There has been developed a single camera system capable of providing color television signals. In such a system, the camera develops encoded signals which must be separated by electrical filters in order to obtain the various color signal components. This invention provides a filtering system of a type which minimizes the cross talk for undesired noise signals which occur with the electrical filters presently being employed.

5 Claims, 5 Drawing Figures

CROSS TALK REDUCING CIRCUITRY FOR ENCODED COLOR TELEVISION CAMERAS

ORIGIN OF INVENTION

The invention described herein was made in the performance of work under a NASA contact and is subject to the provisions of Section 305 of the National Aeronautics and Space Act of 1958, Public Law 85-568 (72 Stat. 435; 42 USC 2457).

BACKGROUND OF THE INVENTION

There has been described a single camera color television system in patents such as U.S. Pat. No. 3,378,633, entitled "System for Scanning Color Encoded Film with a Monochrome TV Camera," and, U.S. Pat. No. 3,585,286, entitled "Spatial Filter Color Encoding and Image Reproducing Apparatus." These cameras produce encoded signals which are separated by electrical filters in order to produce the color component signals which can thereafter be applied to a color television receiver in order to recreate the original scene. Due to the nature of both the filters and the signals, some amount of the signal improperly appears at the output of some filters. This improper output, called "cross talk" increases as the bandwidth of the signals and filters is increased.

OBJECTS AND SUMMARY OF THE INVENTION

An object of this invention is to provide an electrical filtering system which minimizes cross talk in systems of the type described.

Another object of this invention is the provision of a novel electrical filtering system for minimizing cross talk.

These and other objects of the invention may be achieved by taking advantage of the fact that the desired signal has its maximum energy appear at its carrier frequency, which is usually the center of the pass band of its associated filter. A cross talk producing signal will therefore not have its maximum energy appearing at the center of this filter, but at its edge. Therefore, a cross talk producing signal can appear at the output of a filter and still be rejected, if filter circuitry is provided which will discriminate against signals that are concentrated at the band edge of the filter.

Another solution, in accordance with this invention, is to apply the modulated signals simultaneously to a wide band filter and to a narrow band filter. The outputs from these filters are applied to respective detectors whose outputs are then applied to a logic circuit. The logic circuit passes the wide band filter output unaltered as long as its amplitude is less than the narrow band filter output. When the wide band filter output exceeds the narrow band filter output, the wide band filter output is reduced or made zero. This is based on the reasoning that when the narrow band signal is less than the wide signal, the majority of the wide band signal is cross talk.

DESCRIPTION OF THE PREFERRED EMBODIMENTS

Figure 1:
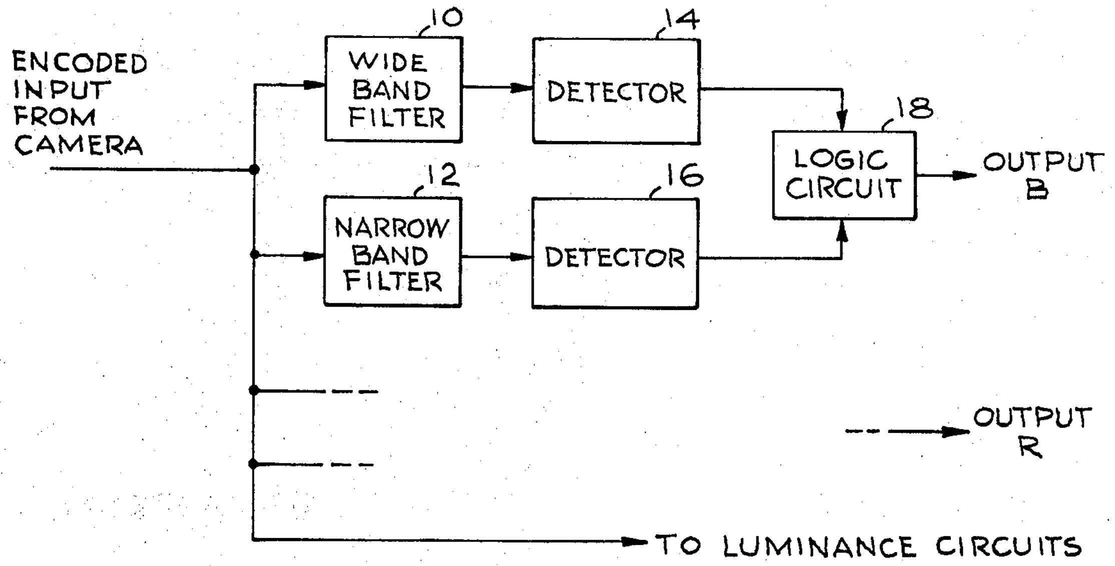
FIG. 1 is a block schematic diagram of one embodiment of the invention.

Referring now to FIG. 1 of the drawings, the encoded output from the camera is applied to two filters to obtain the red and blue television signals. For each one of the color encoded signals, there is provided both a wide band filter 10, and a narrow band filter 12, to which the encoded signals from the camera are applied. The luminance signal is not encoded and is derived in well known fashion and thus will not be discussed here. The output of the wide band filter is applied to an envelope detector circuit 14, and the output of the narrow band filter is applied to an envelope detector circuit 16. The outputs of both detector circuits are applied to logic circuitry 18 which determines whether the signal which has been applied to the wide band filter will be permitted to pass, unaltered or whether this signal will be attenuated.

It can be shown that the output of an appropriately amplified narrow band signal will always exceed that of an appropriately delayed wide band signal, if the wide band signal is amplitude modulated less than 100% and is centered at the center frequency of the narrow band filter. However, since the cross talk producing signal does not have its maximum energy appearing at the center of the filter, the cross talk producing signal may increase the amplitude of the wide band signal until it exceeds the amplitude of the narrow band signal. Thus, if one can provide an output equal to the smaller of the two signals, cross talk is reduced.

Figure 2:
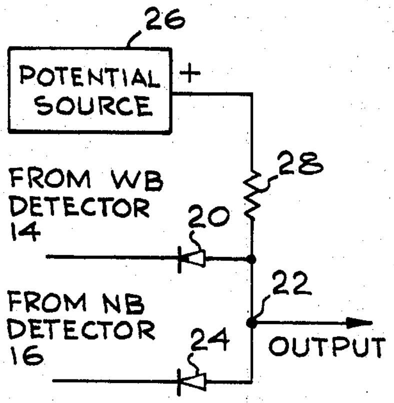
FIGS. 2, 3 and 4 show schematic arrangements for a logic circuit which may be employed in the embodiment of the invention shown in FIG. 1.

FIG. 2 shows an arrangement for enabling the passing of the smaller of the two outputs of the detectors 14, 16. Thus, the output of the detector 14 is applied to a diode 20, which is connected to a junction point 22. The output of the narrow band detector 16 is applied to a diode 24, which is also connected to the junction point 22. A positive potential source 26 also is connected to the junction point through a resistor 28. The junction point 22 serves as the output for the logic circuit.

The circuit described will be recognized as the well known type of logic circuit which will only pass the smaller of the two signals applied to the two diodes 20, 24. The larger of the two signals blocks the diode to which it is applied, thus enabling the other signal to get through the other diode.

Figure 3:
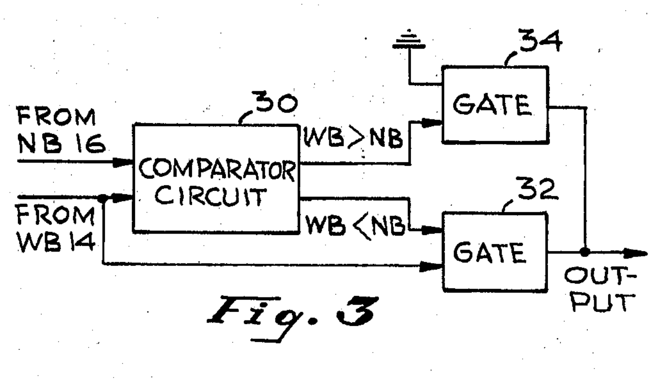

Another arrangement for a logic circuit which may be employed is to cancel the output when cross talk is present, which occurs when the wide band signal is greater than the narrow band signal. An arrangement for doing this is shown in FIG. 3. The outputs from the narrow band and wide band detectors respectively are applied to a comparator circuit 30. The wide band detector output is also applied to a gate 32. The output of the comparator circuit is applied to the gate 32 and also to a gate 34, which has its other input grounded. When the comparator circuit detects that the narrow band signal is greater than the wide band signal, the comparator circuit output is enabled to open gate 32. This enables the wide band detector output to be passed. When the comparator circuit determines that the narrow band detector output is less than the wide band detector output, it enables gate 34 with the result that no output is provided for the logic circuit.

Figure 4:
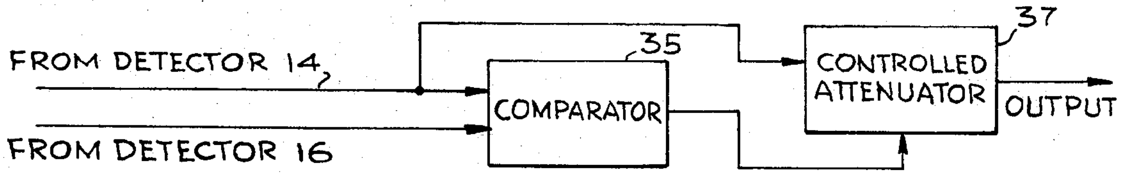

Still another arrangement for the logic circuit 18 is shown in FIG. 4. A comparator circuit 35 receives the outputs from the respective detectors 14 and 16, compares them and provides an output which, when the wide band signal from detector 14 begins to exceed the narrow band signal from the detector 16 causes an attenuator 37 to begin to attenuate the amount of signal passed therethrough from the wide band detector. This attenuation occurs smoothly with increasing output from the attenuator. The attenuator 37 may be a gain controlled amplifier, for example. The attenuation is not necessarily in a linear relationship with the output of the comparator.

Figure 5:
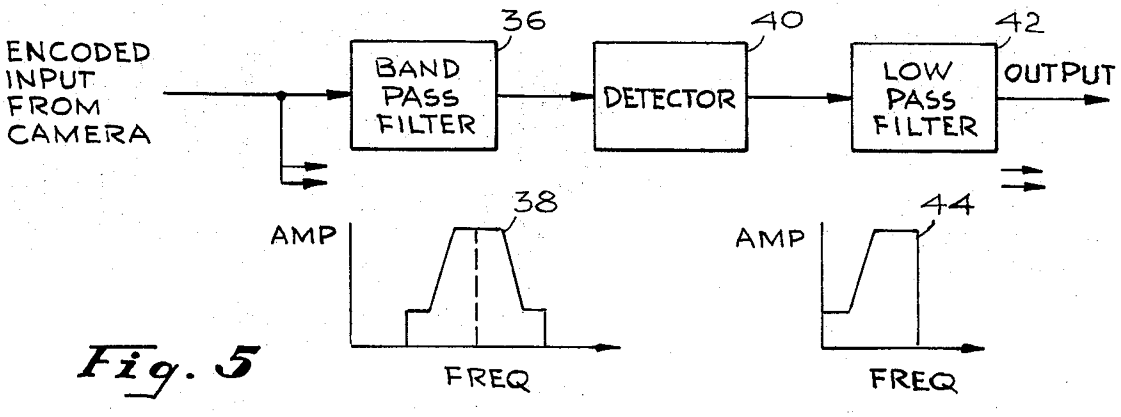
FIG. 5 is a block schematic diagram of another embodiment of the invention.

FIG. 5 shows an arrangement for attempting to accomplish the same objective as the circuit shown in FIG. 1 or 4, but at a lower cost. It is not as effective as the circuit shown in FIG. 1 but is more economical. This system utilizes the nature of the signal envelope to reduce cross talk. A conventional signal, properly centered, has its high modulation frequencies reduced before detection and boosted after detection to provide a flat over-all response. A cross talk producing signal, near the band edge will be attenuated by the band pass filter before detection. After detection much of its energy is at low frequency where it will remain at its attenuated level.

Thus, the encoded input from the camera is applied to the bank pass filter 36, which has an attenuation characteristic such as shown in the waveform 38, which is immediately below. The center of the band pass filter is placed at the encoded color carrier frequency and the sides of the characteristic are sloped, thus attenuating the high modulation frequencies of the signal. The output of the band pass filter is applied to an envelope detector 40, whose output is applied to a low pass filter 42. The low pass filter has the characteristic shown by the waveform 44, immediately below it. The low pass filter characteristic is complementary to that of the upper half of the band pass filter. It is shaped so that it passes and boosts the high modulation frequencies, which were attenuated by the band pass filter, relative to the remainder of the signal frequencies.

The attenuation characteristics of the band pass filter are such that the cross talk producing signals near the band edges are considerably attenuated before detection by the band pass filter 36. After detection, much of the cross talk energy is at low frequency where is remains within the low gain characteristic of the low pass filter 48, and thus its effect on the desired signal is minimized.

The embodiment of the invention shown in FIG. 5 is most useful in those "busy" areas where broad areas of high frequency detail, such as grass fields, tend to produce additional low frequency output in the color detectors because of cross talk. The embodiment of the invention shown in FIGS. 1 and 4 may be employed both in the regions specified for FIG. 5 as well as where many rapid transitions occur in the picture.

There has been accordingly described and shown herein a novel and useful filter arrangement for use with encoded color television signals where cross talk minimization is desired.

What is claimed is:

1. In a system wherein encoded color television signals are provided and wherein it is desired to separate these encoded color television signals into separate color components while minimizing cross talk, a filter arrangement for separating out each color component, each arrangement including:

a first and second filter to which the encoded color television signals are applied, said first filter passing signals over a band of frequencies which is wide when compared to the band of signal frequencies passed by said second filter, both filters having their pass bands centered on the same carrier frequency, a first and second waveform detector connected to respectively receive the output of the first and second filters, and logic circuit means connected to receive the outputs of said first and second waveform detectors for passing unaltered the output from the first detector so long as its amplitude is less than the amplitude of the second detector.

2. In a system as recited in claim 1 wherein said logic circuit means includes means for passing the output of the second detector when the amplitude of the second detector output exceeds that of the first.

3. In a system as recited in claim 1 wherein said logic circuit means includes means for preventing any output from the first detector when the amplitude of the second detector output exceeds that of the first.

4. In a system as recited in claim 1 wherein said logic circuit means includes means for comparing the amplitudes of the outputs of said first and second detectors for producing an output when the amplitude of said second detector exceeds the amplitude of said first detector, and means for attenuating the output of said first detector responsive to the output of said means for comparing.

5. In a system wherein encoded color television signals are provided and wherein it is desired to separate these encoded color television signals into separate color components while minimizing cross talk, a filter arrangement for separating out each color component, each arrangement including:

band pass filter means to which the encoded color television signals are applied, said band pass filter means having its center frequency at the modulating frequency of an encoded television signal, said band pass filter means having attenuation characteristics such that the amplitude of signals with frequencies near the edges of the range of frequencies passed by said filter are substantially attenuated when compared to the amplitude of signals with frequencies occurring near the center of said filter frequency pass band, there being a gradual transition in said characteristics between frequencies near the edge of the band pass and frequencies adjacent the center of the frequency band pass, said band pass filter means having its center frequency at the modulating frequency of an encoded television signal, a detector to which the output of the band pass filter means is applied, a low pass filter means for passing signals which are demodulated by said detector from the high modulation frequencies which are above the center of the pass band center frequency, said low pass filter means having attenuation characteristics and complementary to the attenuation characteristics of the upper half of the pass band filter to provide a resulting substantially flat attenuation characteristic, and means for applying the output of said detector to said low pass filter means.

* * * * *